Patented Mar. 17, 1931

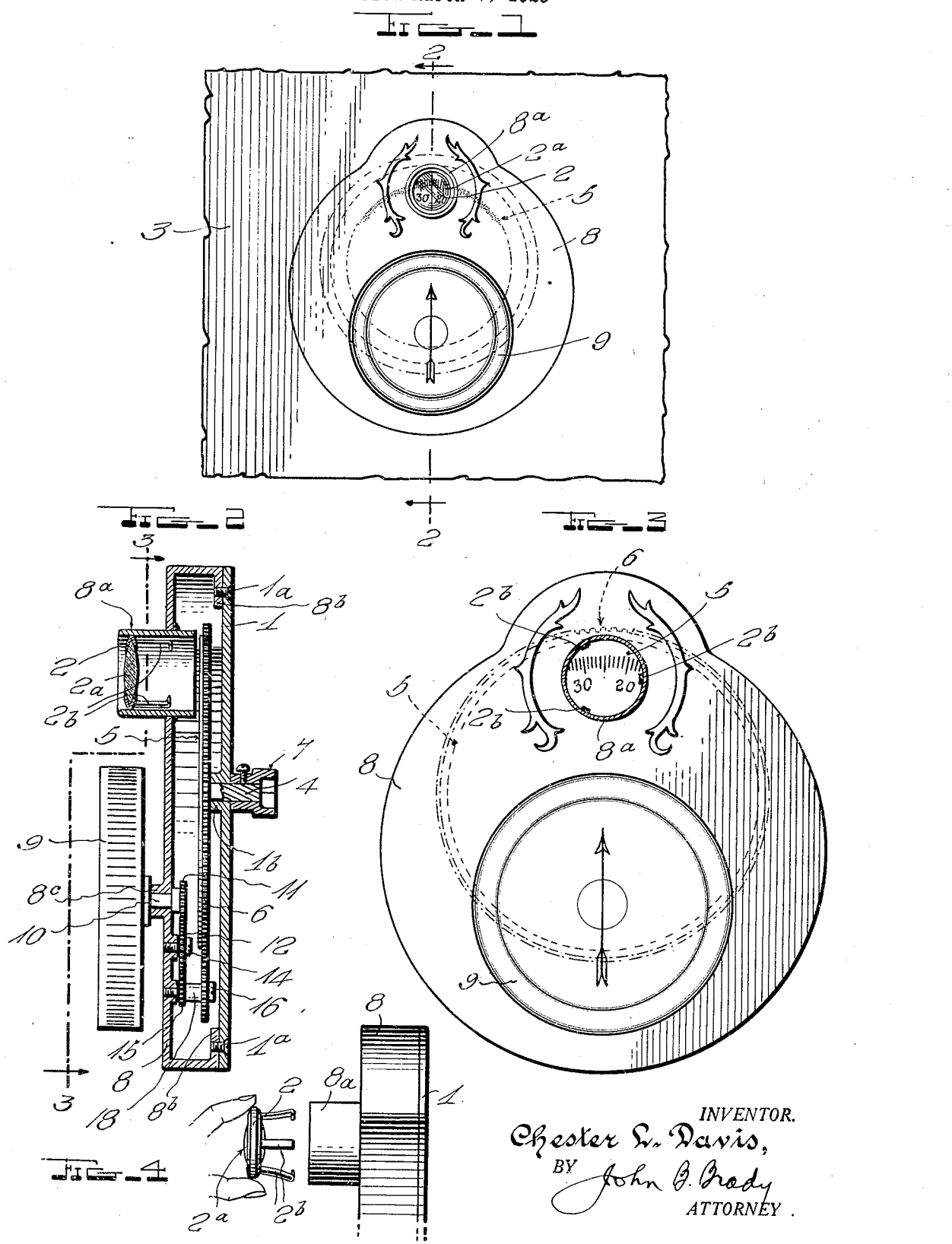

1,796,863

UNITED STATES PATENT OFFICE

CHESTER L. DAVIS, OF WASHINGTON, DISTRICT OF COLUMBIA, ASSIGNOR TO WIRED RADIO, INC., OF NEW YORK, N. Y., A CORPORATION OF DELAWARE

FREQUENCY-ADJUSTING MEANS FOR HIGH-FREQUENCY SIGNALING SYSTEMS

Application filed March 7, 1929. Serial No. 345,167.

My invention relates to high frequency signaling systems in general and more specifically to apparatus employed in radio transmitters and receivers.

An object of my invention is to provide certain improvements in frequency calibration of radio receivers and transmitters.

Another object of my invention is to provide an improved frequency adjusting system for high frequency apparatus.

Still another object of my invention is to provide an improved frequency indicating system which is of compact form and applicable for installation on radio broadcast transmitters and receivers.

A further object of my invention is to provide a construction of control unit insertable in the control panel of a frequency adjusting apparatus which unit contains a rotatable micrometer adjusting device and means for magnifying the calibrations on the rotary indicator which is housed within the control unit.

My invention can be better understood from the specification hereinafter following by reference to the accompanying drawings, wherein:

Figure 1 is an elevational view showing the control unit of my invention inserted in the panel of the frequency control apparatus; Fig. 2 is a cross-sectional view through the control apparatus of Figure 1 on line 2—2 thereof; Fig. 3 is a front elevational view of the control unit of my invention partially in cross-section on line 3—3 of Fig. 2; and Fig. 4 is a fragmentary view of the control unit illustrating the means which I provide for mounting an enlarging lens in the control unit for increasing the precision with which the calibrations on the dial may be observed.

In high frequency signaling systems, both transmitters and receivers, some form of frequency adjusting means is employed. Associated with such means is provided a dial which is calibrated in frequency or merely in arbitrary numbers from which the frequency may be determined. It is difficult to provide an accurately calibrated disk or dial from which the frequency may be ascertained without designing a dial of large size. This dial then is subject to inaccuracies caused by temperature changes, mechanical imperfections and inability of the operator to properly and accurately determine the calibration indicated at a particular adjustment. In my improvements in high frequency signaling systems I provide certain features whereby the frequency adjustment of the high frequency apparatus may be accurately and readily determined and whereby the frequency is accurately and readily determined from the calibration without needless interpolation.

The control unit of my invention is a precision instrument which is adapted to be connected to the rotary adjusting shaft of a frequency control apparatus for imparting rotary movement to the control shaft and simultaneously moving an indicator which is observable through a sight opening in the front of the control unit. The calibrations on the dial within the control unit are observable through the sight opening and in order to increase the precision with which the control unit may be adjusted, I provide a magnifying device adjustably positioned within the sight opening to enlarge the calibrated divisions on the dial and permit the more accurate reading thereof.

In Fig. 1 of the drawings, I have illustrated the frequency control apparatus as mounted behind an instrument panel 3 through which the control unit which is housed within a shell 8 is mounted. The shell 8 may be of phenol composition, metal, or other suitable material and provides a housing in which the movable parts of the control mechanism of my invention are mounted. The shell 8 has an inwardly directed flange portion 8b at the rear thereof providing securing means for the rear closure plate 1 which is secured to the inwardly engaging flange 8b by suitable screws 1a. The shell 8 is provided with a cylindrical projection 8a in the front thereof which receives the lens carrier 2 carrying lens 2a and having spring fingers 2b projecting therefrom and gripping the interior walls of the cylindrical projection 8a in such manner that the lens may be shifted toward or away from the calibrated dial within the control unit. The rear closure plate 1 is provided with an inwardly projecting bearing portion 1b through which the rotary shaft 4 is journaled. The gear 6 is connected to rotary shaft 4 and carries on the front thereof the calibrated dial which I have indicated at 5. The dial 5 is rotatable in such manner that the peripheral portion thereof passes behind the cylindrical projection 8a in the shell 8 in such manner that the projection 8a functions as a sighting window with respect to the calibrations 5 on the rotatable dial. The calibrated dial 5 is rotated through a system of gears which I have designated at 11, 12, 15, and 17. The gear 11 is carried by rotatable adjusting shaft 10 which is journaled in the bearing portion 8c of the shell 8 of the control unit, the control knob 9 being connected to the shaft 10. Gear 12 is pivotally mounted in position by means of screw 14 on the interior wall of the shell 8. Gear 15 is rotatably mounted on screw 16 which extends into the shell 8. The gear 15 is interconnected by means of rotatable sleeve 18 with the gear 17 so that motion imparted to gear 15 is transmitted to gear 17 which meshes with the gear 6 which carries calibrated dial 5. Motion imparted to adjustable knob 9 is therefore reduced and a slow movement imparted to gear 6 for transmitting a corresponding movement to shaft 4. A coupling device 7 is provided for interconnecting the control unit with the rotary shaft of a frequency adjusting apparatus. The fine calibrations engraved on dial 5 are enlarged to a readily readable size by the lens 2a which is shifted to the proper position with respect to the calibrations on the dial 5. A hairline may be drawn on the lens or suspended within the cylindrical projection 8a in order that readings may be taken for the proper dial setting.

The advantages of the improvements in high frequency signaling systems of my invention are numerous. In the employment of extremely high frequency electrical energy it is essential that the frequency adjusting means be accurately calibrated. To interpolation between two numbers or degrees of the calibration is difficult and accurate determination of the frequency adjustment from the calibrated indicating means is nearly impossible. This is due to the inaccuracy of calibration, mechanical features of construction or minuteness of the calibrated portion. Enlarging the calibrated drum or dial by enlarging its physical dimensions has previously been referred to and obviously is not a desirable feature. By employing an enlarging lens in the manner described, the actual physical enlargement of the calibrated portion with its accompanying disadvantages is avoided, while the dial or drum is optically enlarged to the observer. The calibration may be so small as not to be visible with the eye alone. The features of micro-mechanical adjusting means whereby efforts are made to secure approximate indications is far inferior to the foregoing improvements of my invention. Physical expansion of the dial or drum due to an increase in temperature is greatly reduced by employing a small and accurately calibrated dial or drum.

Many modifications of my invention are possible and it is to be understood that no restrictions upon my invention are intended other than beyond those imposed by the scope of the appended claims.

What I claim as new and desire to secure by Letters Patent of the United States is as follows:

1. A control unit comprising an enclosing casing insertable into an instrument panel, a rotatable shaft member journaled in each side of said casing, gears carried by each of said rotatable shaft members, a calibrated dial carried by the gear on one of said rotatable shaft members and movable within said casing, an adjusting knob connected to the other of said rotatable shaft members, a motion reduction gear interconnecting said aforesaid gears whereby angular movement imparted to said adjusting knob produces smaller angular movement of said calibrated dial, and a sighting window carried by said casing in a position adjacent said adjustng knob for observing the calibrations on said calibrated dial.

2. A control unit insertable into an instrument panel comprising an enclosing casing, means connectible to an instrument adjusting shaft extending through the rear of said casing, an adjustable knob having a control shaft extending through the front of said casing, a motion reduction gear interconnecting said shafts, a calibrated dial rotatable within said casing, and a sighting aperture carried by the front of said casing for observing the calibrations on said dial in accordance with the movement imparted thereto by rotation of said adjusting knob.

In testimony whereof I affix my signature.

CHESTER L. DAVIS.